(12) United States Patent
Erickson et al.

(10) Patent No.: US 11,845,129 B2
(45) Date of Patent: Dec. 19, 2023

(54) BROWN BODY INCLUDING A METAL NANOPARTICLE BINDER

(71) Applicant: HEWLETT-PACKARD DEVELOPMENT COMPANY, L.P., Houston, TX (US)

(72) Inventors: Kristopher J. Erickson, Palo Alto, CA (US); Thomas C. Anthony, Palo Alto, CA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 837 days.

(21) Appl. No.: 16/076,162

(22) PCT Filed: Jul. 31, 2017

(86) PCT No.: PCT/US2017/044675
§ 371 (c)(1),
(2) Date: Aug. 7, 2018

(87) PCT Pub. No.: WO2019/027419
PCT Pub. Date: Feb. 7, 2019

(65) Prior Publication Data
US 2021/0197276 A1 Jul. 1, 2021

(51) Int. Cl.
*B22F 10/28* (2021.01)
*B33Y 10/00* (2015.01)
(Continued)

(52) U.S. Cl.
CPC .............. *B22F 10/28* (2021.01); *B22F 1/054* (2022.01); *B22F 10/14* (2021.01); *B33Y 10/00* (2014.12);
(Continued)

(58) Field of Classification Search
CPC ........ B22F 10/28; B22F 1/0018; B22F 1/105; B22F 1/054; B22F 1/103; B22F 2302/105;
(Continued)

(56) References Cited

U.S. PATENT DOCUMENTS

| 5,749,041 A | 5/1998 | Lakshminarayan et al. |
| 6,048,954 A | 4/2000 | Barlow et al. |

(Continued)

FOREIGN PATENT DOCUMENTS

| CN | 1301281 A | 6/2001 |
| CN | 101622319 A | 1/2010 |

(Continued)

OTHER PUBLICATIONS

Kenzari et al., "Complex Metallic Alloys as New Materials for Additive Manufacturing", Science and Technology of Advanced Materials, vol. 15, Retrieved from Internet: http://iopscience.iop.org/article/10.1088/1468-6996/15/2/02480, 2014, 9 pages.

*Primary Examiner* — Brian D Walck
*Assistant Examiner* — Danielle Carda
(74) *Attorney, Agent, or Firm* — SHOOK, HARDY & BACON L.L.P.

(57) ABSTRACT

According to examples, a brown body has from about 0.02 wt. % to about 10 wt. % of a metal nanoparticle binder, in which the metal nanoparticle binder is selectively located within an area of the brown body to impart a strength greater than about 1 kPa to the area.

15 Claims, 3 Drawing Sheets

(51) Int. Cl.
   *B33Y 80/00* (2015.01)
   *B22F 1/054* (2022.01)
   *B33Y 70/10* (2020.01)
   *B22F 10/14* (2021.01)
   *B22F 1/103* (2022.01)

(52) U.S. Cl.
   CPC ............... *B33Y 70/10* (2020.01); *B33Y 80/00* (2014.12); *B22F 1/103* (2022.01); *B22F 2302/105* (2013.01); *B22F 2302/20* (2013.01); *B22F 2302/253* (2013.01); *B22F 2302/40* (2013.01)

(58) Field of Classification Search
   CPC ............ B22F 2302/20; B22F 2302/253; B22F 2302/40; B22F 10/14; B22F 2003/248; B22F 2999/00; B33Y 10/00; B33Y 70/00; B33Y 80/00; B33Y 70/10; Y02P 10/25; B29C 64/165; B82Y 30/00
   USPC .......................................................... 419/65
   See application file for complete search history.

(56) References Cited

U.S. PATENT DOCUMENTS

| | | | |
|---|---|---|---|
| 6,472,459 | B2 | 10/2002 | Morales et al. |
| 6,814,926 | B2 | 11/2004 | Geving et al. |
| 2004/0081573 | A1 | 4/2004 | Newell |
| 2005/0079086 | A1 | 4/2005 | Farr et al. |
| 2007/0241482 | A1 | 10/2007 | Giller et al. |
| 2013/0052442 | A1 | 2/2013 | Merrill et al. |
| 2015/0069649 | A1 | 3/2015 | Bai |
| 2016/0263828 | A1 | 9/2016 | Ederer et al. |
| 2017/0209923 | A1* | 7/2017 | Giovannetti ............ B22F 10/30 |

FOREIGN PATENT DOCUMENTS

| | | |
|---|---|---|
| CN | 104446394 A | 3/2015 |
| CN | 104446517 A | 3/2015 |
| CN | 104529475 A | 4/2015 |
| CN | 105189092 A | 12/2015 |
| CN | 105881695 A | 8/2016 |
| CN | 106255582 A | 12/2016 |
| CN | 108603295 A | 9/2018 |
| EP | 3408427 A1 | 12/2018 |
| EP | 3621756 A1 | 3/2020 |
| EP | 3621757 A1 | 3/2020 |
| WO | 2015036802 A2 | 3/2015 |
| WO | 2016007224 A2 | 1/2016 |
| WO | 2017/018985 A1 | 2/2017 |
| WO | 2017/131760 A1 | 8/2017 |
| WO | 2019/027419 A1 | 2/2019 |

* cited by examiner

BROWN BODY INCLUDING A METAL NANOPARTICLE BINDER

BACKGROUND

In three-dimensional (3D) printing, an additive printing process may be used to make three-dimensional solid parts from a digital model. 3D printing techniques are considered additive processes because they involve the application of successive layers of material. This is unlike other machining processes, which often rely upon the removal of material to create the final part. In 3D printing, the building material may be cured or fused, which for some materials may be performed using heat-assisted extrusion, melting, or sintering, and for other materials, may be performed using digital light projection technology.

BRIEF DESCRIPTION OF THE DRAWING

Features of the present disclosure are illustrated by way of example and not limited in the following figure(s), in which like numerals indicate like elements, in which.

DETAILED DESCRIPTION

For simplicity and illustrative purposes, the present disclosure is described by an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are a 3D printer, methods for implementing the 3D printer to form a 3D part, and a composition and an agent for use in the method. A 3D part may be printed, formed, or otherwise generated onto a build area platform. The 3D printer may also include a spreader to spread a layer of the composition onto the build area platform, and a printhead to selectively deposit the agent. The 3D printer may form successive layers of the composition, which may be spread and may receive the agent. Energy may be applied to form a green body. Extra composition that does not form part of the green body may be removed and the green body may then be exposed to heating and/or radiation to form the brown body. As used herein, the "brown body" may be understood to be the object that is formed after a green body has been subjected to energy, such as in the form of heat, so that either no polymer binder or trace amounts, e.g., from about 0.01 wt. % to about 1 wt. % of an original polymer binder is present, if it was initially present in the green body. The brown body may include a metal nanoparticle binder in selected areas in which the metal nanoparticle binder has been sintered and may impart a strength of greater than about 1 kPa, for example, at temperature to the selected area. In an aspect, the metal nanoparticle binder may be present in an area of the brown body having a predicted internal tensile stress that exceeds a threshold value based upon analysis of the brown body. The threshold value may be in a range from about 1 kPa to about 100 kPa, and as a further example about 1 kPa. The analysis can be a finite element analysis that is performed prior to formation of the brown body. In an aspect, the brown body may include a portion of sintered build material powder. The brown body may be subjected to additional heating and/or radiation to further sinter the metal nanoparticle binder and/or the build material powder to form a final 3D part. As used herein "3D printed part," "3D part," "3D object," "object," or "part" may be a completed 3D printed part or a layer of a 3D printed part.

Figure 1:
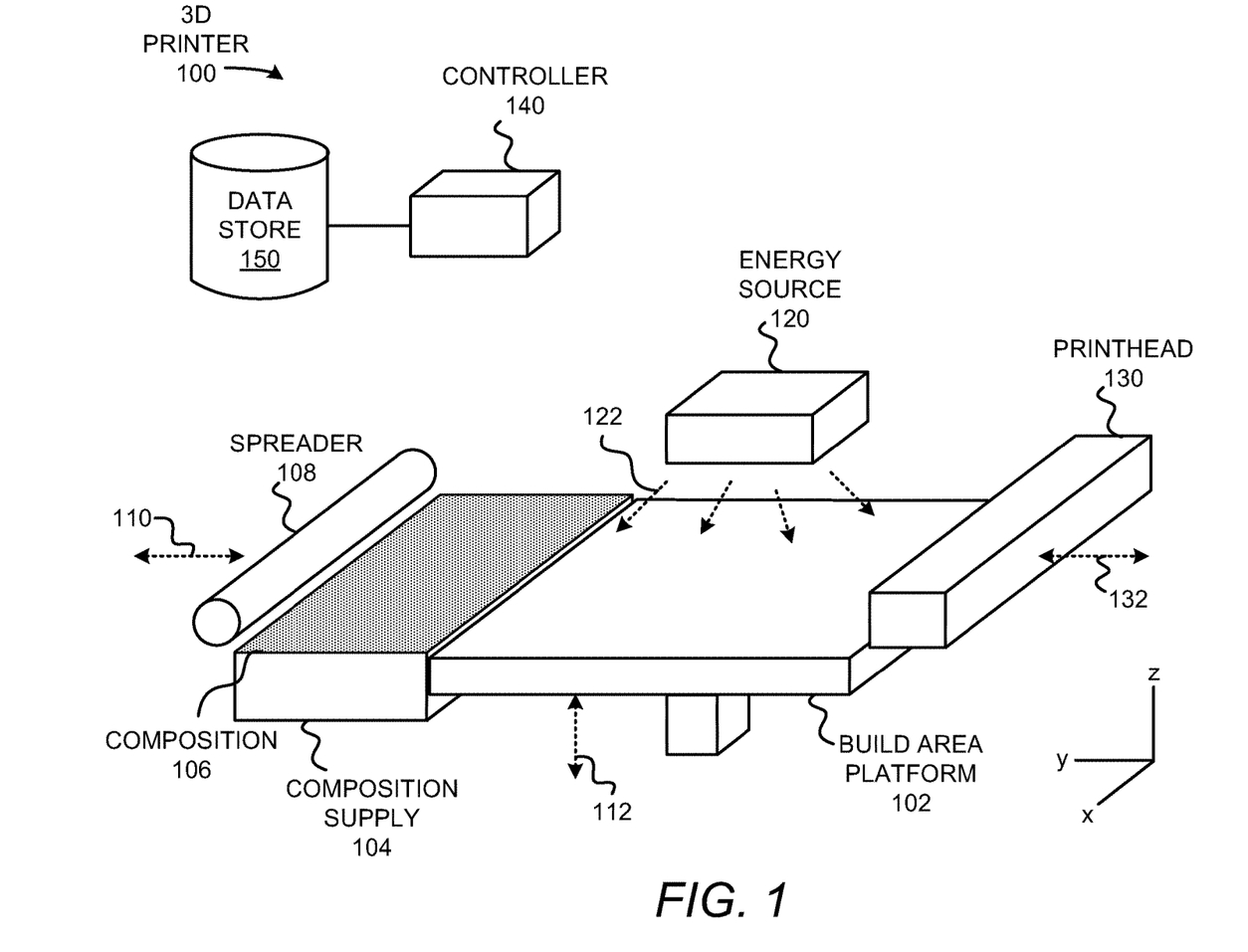
FIG. 1 shows a simplified isometric view of an example three-dimensional (3D) printer for generating, building, or printing three-dimensional parts.

With reference first to FIG. 1, there is shown a simplified isometric view of an example 3D printer 100 for generating, building, or printing three-dimensional parts. It should be understood that the 3D printer 100 depicted in FIG. 1 may include additional components and that some of the components described herein may be removed and/or modified without departing from a scope of the 3D printer 100 disclosed herein. It should also be understood that the components of the 3D printer 100 depicted in FIG. 1 may not be drawn to scale and thus, the 3D printer 100 may have a different size and/or configuration other than as shown therein. The 3D printer 100 may be used to form a brown body having from about 0.02 wt. % to about 10 wt. % of a metal nanoparticle binder, in which the metal nanoparticle binder can be selectively located within an area of the brown body to impart a strength greater than about 1 kPa to the area. The brown body may include a green body having a build material powder, a polymer binder, and from about 0.02 wt. % to about 10 wt. % of a metal nanoparticle binder; in which the metal nanoparticle binder can be selectively located within an area of the brown body to impart a strength greater than about 1 kPa to the area.

The 3D printer 100 is depicted as including a build area platform 102, a composition supply 104 containing the composition 106, and a spreader 108. The build area platform 102 may be integrated with the 3D printer 100 or may be a component that is separately insertable into the 3D printer 100, e.g., the build area platform 102 may be a module that is available separately from the 3D printer 100. The composition supply 104 may be a container or surface that is to position the composition 106 between the spreader 108 and the build area platform 102. The composition supply 104 may be a hopper or a surface upon which the composition 106 may be supplied. The spreader 108 may be moved in a direction as denoted by the arrow 110, e.g., along the y-axis, over the composition supply 104 and across the build area platform 102 to spread a layer of the composition 106 over a surface of the build area platform 102.

The brown body may be formed of a composition 106 that may include a build material powder. The build material powder may be selected from the group consisting of metals, metal alloys, and ceramics. Non-limiting examples of metals include alkali metals, alkaline earth metals, transition metals, post-transition metals, lanthanides, and actinides. The alkali metals may include lithium, sodium, potassium, rubidium, cesium, and francium. The alkaline earth metals may include beryllium, magnesium, calcium, strontium, barium, and radium. The transition metals may include scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, and gold. The post-transition metals include aluminum, indium, tin, thallium, lead, and bismuth. In an example, the build material powder may be chosen from aluminum, copper, $Ti_6Al_4V$, $AlSi_{10}Mg$, bronze alloys, stainless steel, Inconel, and cobalt-chromium, and nickel-molybdenum-chromium alloys.

Non-limiting examples of metal alloys include steel, solder, pewter, duralumin, phosphor bronze, amalgams, stainless steel alloys 303, 304, 310, 316, 321, 347, 410, 420, 430, 440, PH13~8, 17~4PH, Fe/Ni, Fe/Si, Fe/Al, Fe/Si/Al, Fe/Co, magnetic alloys containing Fe/Co/V; satellite 6 cobalt alloy including satellites 12; copper, copper alloys, bronze (Cu/Sn), brass (Cu/Zn), tin, lead, gold, silver, platinum, palladium, iridium, titanium, tantalum, iron, aluminum alloys, magnesium including alloys, iron alloys, nickel alloys, chromium alloys, silicon alloys, zirconium alloys, gold alloys, and any suitable combination.

The ceramics may be nonmetallic, inorganic compounds, such as metal oxides, inorganic glasses, carbides, nitrides, and borides. Some specific examples include alumina ($Al_2O_3$), $Na_2O/CaO/SiO_2$ glass (soda-lime glass), silicon carbide (SiC), silicon nitride ($Si3N_4$), silicon dioxide ($SiO_2$), zirconia ($ZrO_2$), yttrium oxide-stabilized zirconia (YTZ), titanium dioxide ($TiO_2$), or combinations thereof. In an example, the build material powder may be a cermet (a metal-ceramic composite).

The 3D printer 100 is further depicted as including a printhead 130 that may be scanned across the build area platform 102 in the direction indicated by the arrow 132, e.g., along the y-axis. The printhead 130 may be, for instance, a thermal inkjet printhead, a piezoelectric printhead, etc., and may extend a width of the build area platform 102. Although a single printhead 130 has been depicted in FIG. 1, it should be understood that multiple printheads may be used that span the width of the build area platform 102. Additionally, the printheads 130 may be positioned in multiple printbars. The printhead 130 may also deposit an agent over a selected area of a layer of the composition 106. In an aspect, multiple printheads 130 may independently deposit the same or different agent over a selected area of a layer of the composition 106. In an aspect, the multiple printheads 130 can simultaneously or sequentially deposit the same or different agents over a selected area of a layer of the composition 106.

In one example, a first printhead may selectively deposit an agent including a polymer binder over an area of the composition 106. In another example, a second printhead may selectively deposit an agent including a metal nanoparticle binder over an area of a layer of the composition 106. In another example, a printhead may selectively deposit an agent including a polymer binder and a metal nanoparticle binder over an area of the composition 106. In a further example, a printhead may selectively deposit an agent including a polymer binder and a metal salt binder over an area of the composition 106.

The area of composition 106, such as a selected area of the brown body, may include an area in need of additional strength. These areas may be determined prior to spreading the composition 106 on the build platform and based upon the brown body geometry and the further processing of the brown body, i.e., annealing. The printhead 130 may selectively deposit a metal nanoparticle binder in an area of the brown body to impart strength to the area, i.e., improve local strength in an area, such as a strength greater than about 1 kPa to the area. The selected area may include bottoms of bridges, bottoms of cantilevers, sides of the brown body, overhangs of the brown body, edges, fine features, high tolerance areas of the brown body, areas of the brown body with large compression due to geometry, and combinations thereof. There may be other areas of the brown body in which improved local strength may not be needed or required. In these other areas, the printhead 130 may selectively deposit a lesser amount of metal nanoparticle binder, for example, less than 0.2 wt. % including no metal nanoparticle binder.

In an aspect, the metal nanoparticle binder may be present in an area of the brown body in proportion to the predicted internal stress within the brown body as determined by computational stress analysis of the brown body. For example, in areas where the predicted internal tensile stress may be greater than 100 kPa, 5 wt % of metal nanoparticle binder may be deposited. As another example, in areas where the predicted tensile stress may be greater than 10 kPa and less than 100 kPa, 1 wt % of nanoparticle binder may be deposited. As a further example, in areas where the predicted stress may be greater than 1 kPa and less than 10 kPa, 0.3 wt % of metal nanoparticle binder may be deposited. As a further example, in areas where the predicted tensile stress may be less than 1 kPa, no metal nanoparticle binder may be deposited. The foregoing examples are illustrative of the concept of correlating the amount of metal nanoparticle binder selectively deposited by the printhead 130 to the predicted internal stress in the brown body. The analysis used to predict the internal stress may be a finite element analysis that may be performed prior to formation of the brown body.

The agent may be a composition including various components that may be applied to the layer of the composition 106. Non-limiting examples of components of the agent include a polymer binder, a metal nanoparticle binder, a pigment, a dye, a solvent, a co-solvent, a surfactant, a dispersant, a biocide, an anti-cogation agent, viscosity modifiers, buffers, stabilizers, and combinations thereof. The presence of a co-solvent, a surfactant, and/or a dispersant in the agent may assist in obtaining a particular wetting behavior with the composition 106. In an aspect, more than one agent may be used during the 3D printing process. As an example, an agent including a polymer binder may be deposited over a selected area of the composition 106. As another example, an agent including a metal nanoparticle binder may be deposited over a select area of the composition 106.

The polymer binder may be a semi-crystalline polymer, such as polypropylene and polyethylene. The polymer binder may be a non-crystalline polymer, such as polyethylene oxide, polyethylene glycol (solid), acrylonitrile butadiene styrene, polystyrene, styrene-acrylonitrile resin, and polyphenyl ether. The polymer binder may be selected from the group consisting of polypropylene, polyethylene, low density polyethylene, high density polyethylene, polyethylene oxide, polyethylene glycol, acrylonitrile butadiene styrene, polystyrene, poly(methyl methacrylate), styrene-acrylonitrile resin, polyphenyl ether, polyamide 11, polyamide 12, polymethyl pentene, polyoxymethylene, polyethylene terephthalate, polybutylene terephthalate, polyvinylidene fluoride, polytetrafluoroethylene, perfluoroalkoxy alkane, polyphenylene sulfide, and polyether ether ketone.

The polymer binder may have a melting point temperature less than about 250° C., for example it may range from about 50° C. to about 249° C., for example from about 60° C. to about 240° C., and as a further example from about 70° C. to about 235° C.

The polymer binder may be present in the agent in an amount ranging from about 1% to about 6% by volume, for example from about 2% to about 5%, and as a further example from about 3% to about 5% by volume. In another aspect, the polymer binder may be present in the agent in an amount up to 100% by volume loading, for example, if using a piezo ink jet to jet the polymer precursor materials. The amount of the polymer binder may be chosen to provide shape integrity.

The agent may further include other suitable binders such as metal salts, sugars, sugar alcohols, polymeric or oligomeric sugars, low or moderate molecular weight polycarboxylic acids, polysulfonic acids, water soluble polymers containing carboxylic or sulfonic moieties, and polyether alkoxy silane. Some specific examples include glucose ($C_6H_{12}O_6$), sucrose ($C_{12}H_{22}O_{11}$), fructose ($C_6H_{12}O_6$), maltodextrines with a chain length ranging from 2 units to 20 units, sorbitol ($C_6H_{14}O_6$), erythritol ($C_4H_{10}O_4$), mannitol ($C_6H_{14}O_6$), or CARBOSPERSE® K7028 (a short chain polyacrylic acid, M~2,300 Da, available from Lubrizol). Low or moderate molecular weight polycarboxylic acids (e.g., having a molecular weight less than 5,000 Da) may dissolve relatively fast. It is to be understood that higher molecular weight polycarboxylic acids (e.g., having a molecular weight greater than 5,000 Da up to 10,000 Da) may be used; however the dissolution kinetics may be slower.

The agent may include a metal nanoparticle binder. The metal nanoparticle binder may promote interparticle bonding of the build material powder and/or may increase the interparticle friction between the build material powder. The metal nanoparticle binder may be a material that will bond to the build material powder at temperatures which are in or below the relevant debile temperature range. For example, without limitation, the metal nanoparticle binder may be the same ceramic, metal or metal alloy or a metal or metal alloy that diffuses into the build material powder, e.g., silver or gold nanoparticles may be used with gold alloy build material powder. Additional non-limiting examples of metal nanoparticle binder may include AlN, SiC, $Si_3N_4$, WC, $Al_2O_3$, $Al(OH)_3$, $Fe_2O_3$, $Fe_3O_4$, MgO, $SiO_2$, $TiO_2$, $Y_2O_3$, ZnO, $ZrO_2$, $BaCO_3$, $In_2O_3$, $SnO_2$, carbon, magnesium, manganese, aluminum, iron, titanium, niobium, tungsten, chromium, tantalum, cobalt, nickel, vanadium, zirconium, molybdenum, palladium, platinum, copper, saver, gold, cadmium, zinc, and combinations of these with each other and/or with a nonmetallic element or elements. In an aspect, the metal present in the metal nanoparticle binder may be the same as a metal in the build material powder. In another aspect, the metal present in the metal nanoparticle binder may be different from a metal in the build material powder.

The metal nanoparticle binder may be particles with dimensions that are in the nanometer size range, that is, from about 1 nanometer to about 1,000 nanometers. In an example, the nanoparticles may be in a size range of about 1 nanometers to about 100 nanometers, and for example within a range of about 1 to about 50 nanometers. The nanoparticles may have any shape. The nanoparticle material kind, size, and shape may be chosen so that the nanoparticles interparticle bond to the build material powder through either chemical or physical bonding to provide structural strength to the as-built brown body.

The metal nanoparticle may be present in the brown body in an amount ranging from about 0.02 wt. % to about 10 wt. %, for example, from about 0.02 wt. % to about 5 wt. %, and as a, further example, from about 0.02 wt. % to about 0.5 wt. %.

The 3D printer 100 may include multiple printheads 130, in which each printhead 130 may have the same or different agent. In an example, a printhead 130 may have an agent including a polymer binder; and another printhead 130 may have an agent including a metal nanoparticle binder.

Additionally, the agent of each printhead may independently include more than one kind of polymer binder or metal nanoparticle binder. For example, an agent including a metal nanoparticle binder may include metal nanoparticles of both gold alloys and of silver alloys. Similarly, an agent including a polymer binder may include polypropylene and polyethylene. As a further example, an agent may include a polymer binder and a metal nanoparticle binder. This may be useful where it is desired to locally vary the composition of the agent.

Surfactant(s) may be used to improve the wetting properties and the jettability of the agent. Examples of suitable surfactants may include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, previously known as ZONYL FSO), and combinations thereof. In other examples, the surfactant may be an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6 from The Dow Chemical Company). In some examples, it may be desirable to utilize a surfactant having a hydrophilic-lipophilic balance (HLB) less than 10.

Some examples of a co-solvent include 1-(2-hydroxyethyl)-2-pyrollidinone, 2-Pyrrolidinone, 1,5-Pentanediol, Triethylene glycol, Tetraethylene glycol, 2-methyl-1,3-propanediol, 1,6-Hexanediol, Tripropylene glycol methyl ether, N-methylpyrrolidone, Ethoxylated Glycerol-1 (LEG-1), and combinations thereof.

Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from The Dow Chemical Co.).

Non-limiting examples of suitable anti-cogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol).

Following selective deposition of the agent onto selected areas of the layer of the composition 106, the build area platform 102 may be lowered as denoted by the arrow 112, e.g., along the z-axis. In addition, the spreader 108 may be moved across the build area platform 102 to form a new layer of composition 106 on top of the previously formed layer. In an aspect, the spreader 108 may spread a layer of build material powder. Moreover, the printhead 130 may deposit the agent onto predetermined areas of the new layer of composition 106. For example, the printhead 130 may selectively deposit from 0.02 wt. % to about 10 wt. % of a metal nanoparticle binder onto the layer of the build material powder. The above-described process may be repeated until a predetermined number of layers have been formed to fabricate a green body of a desired 3D part.

As also shown in FIG. 1, the 3D printer 100 may include a controller 140 that may control operations of the build area platform 102, the composition supply 104, the spreader 108, the energy source 120, and the printhead 130. The controller 140 is also depicted as being in communication with a data store 150. The data store 150 may include data pertaining to a 3D part to be printed by the 3D printer 100.

A green body may be created from areas of the composition 106 that have received the agent from the printhead 130. Upon application of energy 122, such as by heat lamps, ultraviolet lights, and the like, the selectively deposited agent may absorb the energy to form a green body from the spread layer of build material powder, the deposited metal nanoparticle binder, and any polymer binder, if present.

The applied energy 122 may be removed and the green body may begin to cool. Upon cooling, the formed green body may solidify. The formed green body may be removed from the build platform and moved to a furnace or other heating apparatus in order to form a brown body.

Figure 2:
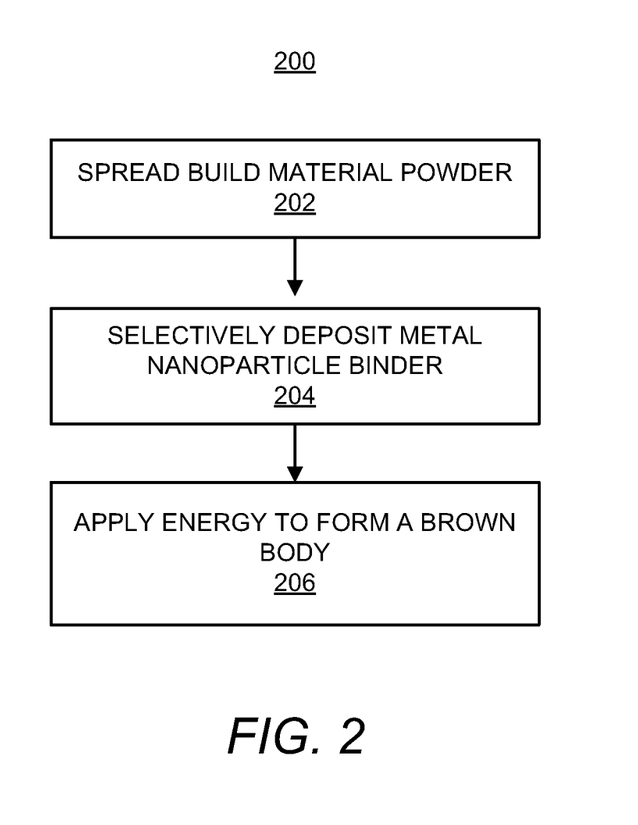
FIGS. 2 and 3, respectively, show flow diagrams of example methods of fabricating a 3D part.
Figure 3:
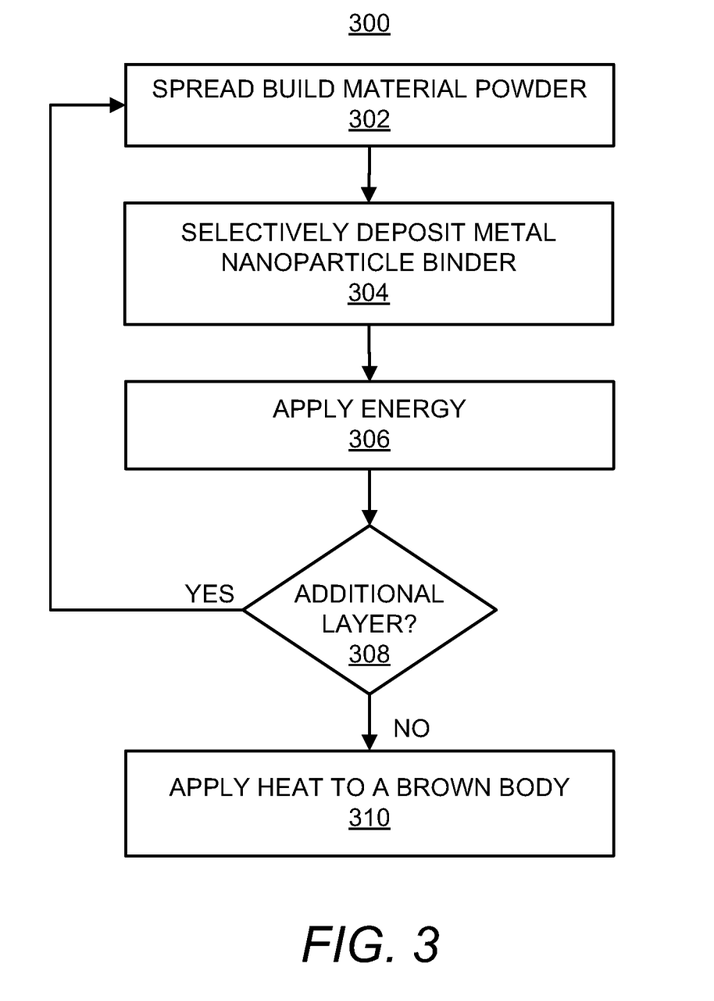

Various manners in which an example 3D part may be fabricated are discussed in greater detail with respect to the example methods 200 and 300 respectively depicted in FIGS. 2 and 3. It should be apparent to those of ordinary skill in the art that the methods 200 and 300 may represent generalized illustrations and that other operations may be added or existing operations may be removed, modified, or rearranged without departing from the scopes of the methods 200 and 300.

The descriptions of the methods 200 and 300 are made with reference to the 3D printer 100 illustrated in FIG. 1 for purposes of illustration. It should, however, be clearly understood that 3D printers and other types of apparatuses having other configurations may be implemented to perform either or both of the methods 200 and 300 without departing from the scopes of the methods 200 and 300.

Prior to execution of the method 200 or as part of the method 200, the 3D printer 100 may access data pertaining to a 3D part that is to be printed. By way of example, the controller 140 may access data stored in the data store 150 pertaining to a 3D part that is to be printed. The controller 140 may determine the number of layers of composition 106 that are to be formed and the locations at which an agent, such as a metal nanoparticle binder, from the printhead 130 is to be selectively deposited on areas, to impart improved local strength, of each of the respective layers of composition 106 in order to print the 3D part.

With reference first to FIG. 2, at block 202, a composition 106 may be spread over a build area platform 102. As discussed herein, the composition 106 may be formed of build material powder. In addition, at block 204, a metal nanoparticle binder may be selectively deposited onto an area, to impart improved strength to the area, on the spread layer of the build material powder.

At block 206, energy 122 may be applied onto the spread layer of build material powder, and the selectively deposited metal nanoparticle binder to form a green body. Block 206 may represent a plurality of operations in which multiple layers of build material powder are spread, selectively deposited with metal nanoparticle binder, and supplied with energy to form the green body, in which the metal nanoparticle binder may be selectively located within an area of the green body to impart an improved strength of greater than about 1 kPa to the selected areas in a brown body.

Turning now to FIG. 3, at block 302, the build material powder may be spread and at block 304, a metal nanoparticle binder may be selectively deposited onto the layer of build material powder. Blocks 302 and 304 may be similar to blocks 202 and 204 discussed above with respect to FIG. 2. In addition, at block 306, energy 122 may be applied in manners similar to those discussed above with respect to block 206. At block 308, a determination may be made, for instance, by a processor of the 3D printer 100, as to whether an additional layer of the build material powder is to be formed. In response to a determination that another layer of the build material powder is to be formed, blocks 302-306 may be repeated on top of a previously deposited layer.

However, in response to a determination that an additional layer is not to be formed, the formed layers, e.g., green body, may be cooled and removed from the 3D printer 100.

Extraneous composition, such as the build material powder may be removed to form the green body. By way of example, the green body may be placed in a media blasting cabinet and the extraneous composition may be sandblasted away from the green body. An air gun or brush may be used to remove extraneous composition. As another example, the extraneous composition may be removed through mechanical vibration and/or other removal techniques.

Following removal of the extraneous composition, the green body may be subjected to further processing to form a brown body and/or a final 3D part. Heat or radiation may be applied from a heat or radiation source (not shown) to form the brown body. By way of example, the green body may be placed into a furnace or oven that is able to heat the green body at different temperatures, in which the different temperatures may range from a temperature that is approximately equal to the melting/debinding temperature of the polymer binder to a temperature that is sufficient to cause the build material powder of the composition to debind and/or sinter with metal nanoparticle binder. The metal nanoparticle binder may interparticle bind with the build material powder to provide increased structural strength to the final 3D part. The interparticle binding may prevent the final 3D part from sagging, warping, breaking, or otherwise disfiguring from an intended shape. This may be beneficial in large 3D parts or 3D parts having thin or unsupported sections. In another example, the green body may be placed in multiple furnaces or ovens that are each at different temperatures during successive periods of time in order to form the brown body and/or the final 3D part.

The temperatures at which the heat is applied may be progressively increased. That is, at block 310, energy, for example, in the form of heat, may be applied to the green body at a temperature, which may be equal to approximately a melting/debinding temperature of a polymer binder. The brown body may no longer include a polymer binder and/or substantial polymer binder residue after a period of time because any residual polymer binder in the brown body may change the chemical composition and properties of the brown body. In an aspect, the brown body may include either no polymer binder or trace amounts of the polymer binder, for example from about 0.01 wt. % to about 1 wt. % of a polymer binder, present in the green body In an aspect, polymer binder removal (i.e., debinding) may be difficult in large objects, such as those objects having greater than 10 mm wall thicknesses.

At block 310, applying energy may further include applying sufficient energy to the brown body, such as in the form of heat, to sinter the build material powder. The metal nanoparticle binder may include a metal that is the same as or different than the metal in the build material powder.

By way of example, the temperature may progressively increase from a temperature greater than about 300° C., for example above 500° C., to greater than about 1000° C. and in other examples, above around 1500° C. In addition, the increasing temperature may cause the density and/or strength of the brown body to be increased. In an aspect, a temperature greater than about 300° C. may be applied to form a brown body having a strength greater than about 1 kPa, for example, greater than about 1.5 kPa, and as a further example from about 2.0 kPa. The length of time at which the heat is applied may be dependent, for example, on at least one of: characteristics of the heat or radiation source, characteristics of the build material powder; and/or characteristics of the agent. In an example, the heat may be applied in an oxidizing or a reducing atmosphere and with or without an inert gas. In another example, oxidizing and reducing atmospheres may also be used during annealing. In yet another example, heat may be applied in a vacuum.

The brown body may have sufficient strength to support itself without breaking at a temperature during annealing. The brown body may also have sufficient strength to support itself without sagging.

In order to determine possible areas of a brown body that may need additional local strength, an analysis may be performed. For example, a finite element analysis may be used for predicting placement and loading of the metal nanoparticle binder in selected areas to impart improved strength to those areas to the brown body. As a further example, the metal nanoparticle binder may be selectively deposited in areas of the brown body where stress exceeds a certain level. The analysis may include adding potential forces expected to be applied to the brown body during different parts of the process including, but not limited to, the printing process, post-printing process, removal from the printer, negative space powder removal, handling of the separated green body (either by hand or an automated process), and placement of the brown body into a sintering furnace. In an aspect, the analysis may include expected forces applied to the brown body during an annealing process, including but not limited to, gravity of the part, and pressure from build-up of polymer binder decomposition products. The placement and loading of the metal nanoparticle binder may impart improved strength, such as greater than about 1 KPa to the selected area, so that the brown body does not break or sag.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A brown body comprising:
   from about 0.02 wt. % to about 10 wt. % of a metal nanoparticle binder present in a selectively located area of the brown body to impart a tensile strength from about 1 kPa to about 100 kPa to the area, wherein the selectively located area of the brown body is an overhang or a bottom of a bridge, wherein the wt. % that is present in the selectively located area is proportional to a predicted internal stress for the overhang or the bottom of the bridge; and
   wherein less than 0.02 wt. % of metal nanoparticle binder present in other areas of the brown body.

2. The brown body of claim 1, wherein the metal nanoparticle binder is selected from the group consisting of AlN SiC, Si13N4, WC, Al2O3, Al(OH)3, Fe2O3, Fe3O4, MgO, SiO2 TiO2, Y2O3, ZnO, ZrO2, BaCO3, In2O3, SnO2, carbon, magnesium, aluminum, iron, titanium, niobium, tungsten, chromium, tantalum, cobalt, nickel, vanadium, zirconium, molybdenum, palladium, platinum, copper, silver, gold, cadmium, zinc, and combinations thereof.

3. The brown body of claim 1, wherein the metal nanoparticle binder is present in an amount ranging from about 0.02 wt. % to about 5 wt. %.

4. The brown body of claim 1, wherein the metal nanoparticle binder is present in an amount ranging from about 0.02 wt. % to about 0.5 wt. %. powder.

5. The brown body of claim 1, further comprising a build material powder.

6. The brown body of claim 5, wherein a metal present in the metal nanoparticle binder is the same as a metal in the build material powder.

7. The brown body of claim 5, wherein a metal present in the metal nanoparticle binder is different from a metal in the build material powder.

8. The brown body of claim 1, wherein the metal nanoparticle binder is selectively located within the area chosen from bottoms of cantilevers, sides of the brown body, edges, fine features, high tolerance areas of the brown body, areas of the brown body with large compression due to geometry, and combinations thereof.

9. A method comprising:
   spreading a layer of build material powder;
   selectively depositing from about 0.02 wt.% to about 10 wt. % of a metal nanoparticle binder onto the layer of the build material powder; and
   applying energy at a temperature greater than about 300° C. to form a brown body; and
   wherein the metal nanoparticle binder is selectively located within an area of the brown body that is an overhang or a bottom of a bridge, and wherein the metal nanoparticle binder is selectively deposited to impart a tensile strength from about 1 kPa to about 100 kPa to the area that is the overhang or the bottom of a bridge; and wherein less than 0.02 wt. % of metal nanoparticle binder is present in other areas of the brown body.

10. The method of claim 9, wherein the brown body has sufficient strength to support itself without breaking at a temperature during annealing.

11. The method of claim 9, wherein the brown body has sufficient strength to support itself without sagging.

12. The method of claim 9, further comprising, prior to selectively depositing the metal nanoparticle binder, determining areas of the brown body where the metal nanoparticle binder is to be selectively deposited to impart additional strength to the determined areas.

13. The method of claim 9, wherein selectively depositing the metal nanoparticle binder further comprises selectively depositing the metal nanoparticle binder in areas of the brown body where expected stress exceeds a certain level.

14. The method of claim 9, wherein selectively depositing the metal nanoparticle binder further comprises selectively depositing the metal nanoparticle binder in areas of the brown body that include bottoms of cantilevers, sides of the brown body, edges, fine features, high tolerance areas of the brown body, areas of the brown body with large compression due to geometry, and combinations thereof.

15. A brown body, comprising:
a green body including a build material powder, a polymer binder, and from about 0.02 wt. % to about 10 wt. % of a metal nanoparticle binder; and
wherein the metal nanoparticle binder is selectively located within an area of the brown body that is an overhang or a bottom of a bridge to impart a tensile strength from about 1 kPa to about 100 kPa to the overhang or the bottom of a bridge; and wherein less than 0.02 wt. % of metal nanoparticle binder is present in other areas of the brown body.

* * * * *